April 29, 1958  H. ERDMANN  2,832,128
TOOLS FOR USE IN ASSEMBLING RETAINING RINGS
ON SHAFTS, PINS AND THE LIKE
Filed Dec. 7, 1955  4 Sheets-Sheet 1

INVENTOR
HANS ERDMANN

BY *Harold Hilcoyne*

ATTORNEY

April 29, 1958 H. ERDMANN 2,832,128
TOOLS FOR USE IN ASSEMBLING RETAINING RINGS
ON SHAFTS, PINS AND THE LIKE
Filed Dec. 7, 1955 4 Sheets-Sheet 2
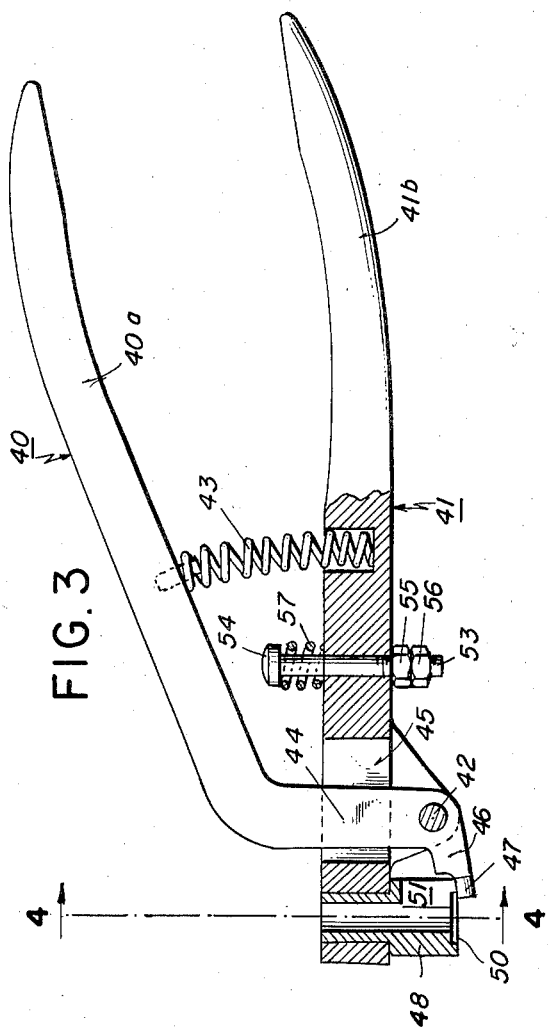
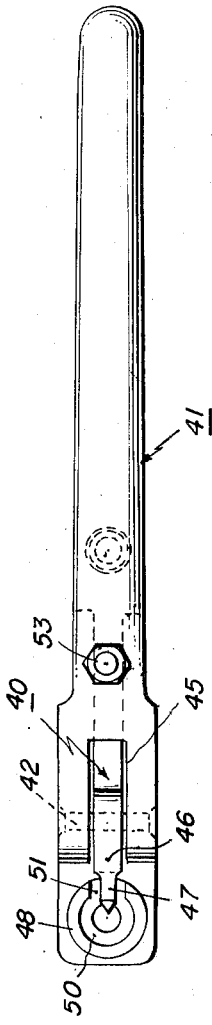
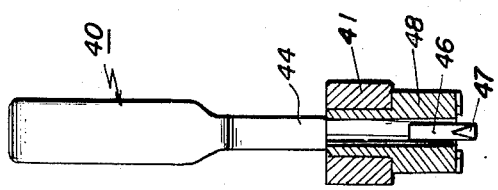
INVENTOR
HANS ERDMANN
BY
ATTORNEY

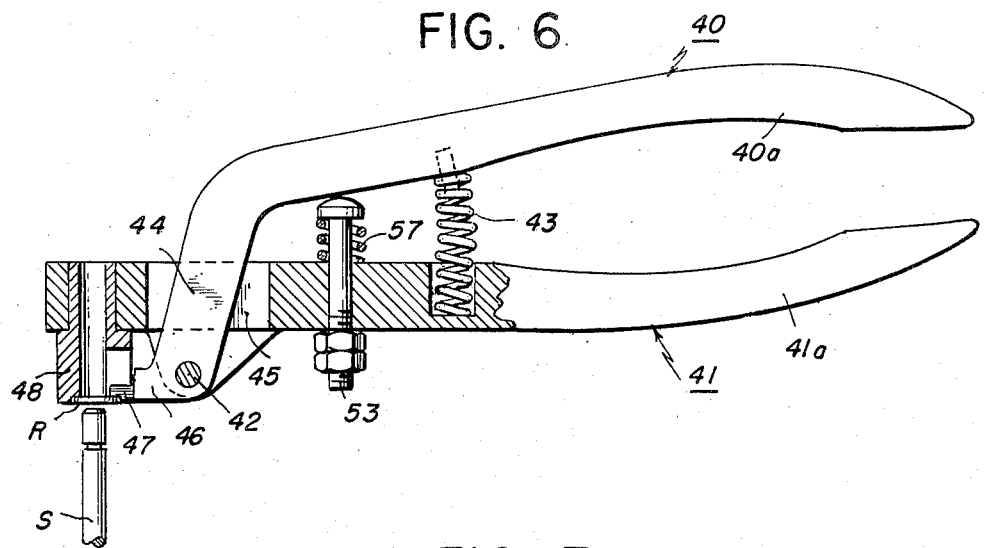
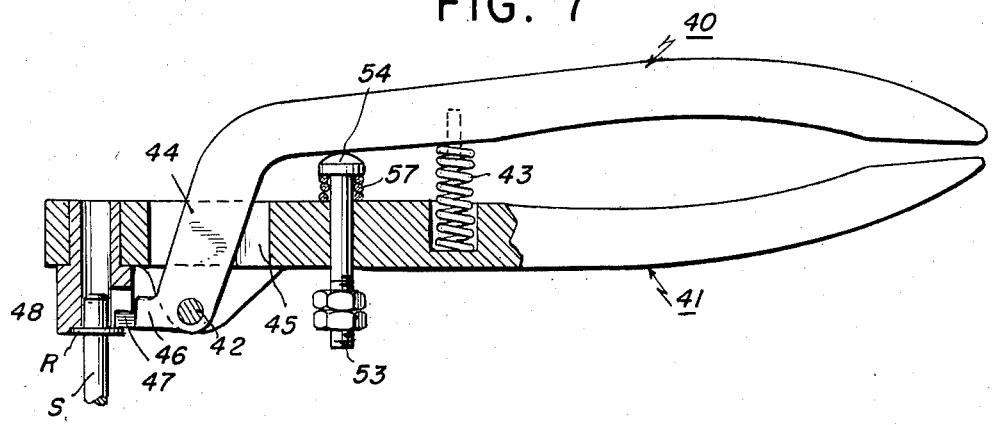
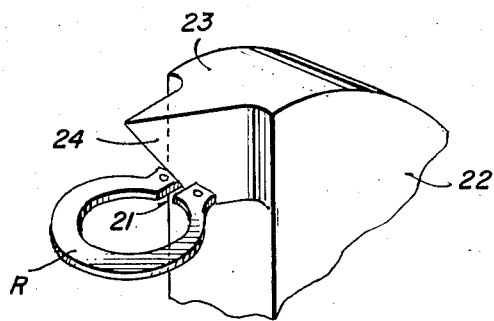

April 29, 1958 H. ERDMANN 2,832,128
TOOLS FOR USE IN ASSEMBLING RETAINING RINGS
ON SHAFTS, PINS AND THE LIKE
Filed Dec. 7, 1955 4 Sheets-Sheet 4

INVENTOR
HANS ERDMANN
BY
ATTORNEY

United States Patent Office 2,832,128
Patented Apr. 29, 1958

2,832,128

TOOLS FOR USE IN ASSEMBLING RETAINING RINGS ON SHAFTS, PINS AND THE LIKE

Hans Erdmann, Maplewood, N. J., assignor to Waldes Kohinoor, Inc., Long Island City, N. Y., a corporation of New York Application December 7, 1955, Serial No. 551,582

7 Claims. (Cl. 29—229)

This invention relates to improvements in tools for use in assembling retaining rings on shafts, pins and the like, and more particularly to an improved plier-type hand tool intended primarily but not exclusively for spreading so-called "grip" rings preparatory to applying them to their shafts or pins.

As explained in pending Feitl application Serial No. 479,168, now Patent No. 2,814,097, filed December 31, 1954, directed to stationary, i. e. bench-type, apparatus designed to mechanize the assembly of so-called "grip" rings of the type disclosed and claimed in Heimann United States Patent No. 2,574,304, dated November 6, 1952 (which application and patent, together with the present application, are commonly owned), the assembly of such rings, which are distinguished by their ability to secure themselves to the peripheral surface of a shaft or pin solely by friction, is rendered difficult because they must not be spread in excess of five percent of their free diameter. Heretofore, such a precise control of ring spreading was not possible with conventional plier-type hand tools, a factor leading to the development of the aforesaid Feitl apparatus.

However, since plier-type hand tools are widely used in assembling conventional open-ended retaining rings, it is desirable for commercial reasons to make available the same general type of tool for use in assembling "grip" rings also, and accordingly a main object of the present invention is the provision of a simple plier-type hand tool for use with "grip" rings which matches the available hand tools used in assembling conventional retaining rings in effectiveness and ease of operation.

Another important object of the invention is the provision of a plier-type tool for spreading external retaining rings preparatory to their assembly on shafts, pins and like carrier members and whose construction is such that the degree of their spreading must be precisely controlled, wherein tool structure and formation determines the maximum amount that rings may be spread thereby.

More particularly, it is an object of the invention to provide a tool as aforesaid providing a ring pocket whose side wall is formed complementally to the outer-edge contour of a grip ring to be assembled on a shaft, pin or the like, upon said ring being spread the maximum predetermined amount permitted by its design, and which further incorporate a wedge means operating responsively to the tool handles being compressed to spread a ring seated in said pocket in such a way that not only is the ring effectively spread the maximum permissible amount aforesaid but also it is positively held to its seat during the spreading operation.

A further object of the invention is the provision of a ring spreading tool as above, which is so constructed and arranged that the wedge means, in spreading the ring as aforesaid, moves in a direction generally at right angles to the plane of the seated ring, rather than in the plane of the ring according to a prior suggestion.

Yet another object of the invention is a ring spreading tool of the stated character in which provision is made for the case wherein, either by choice or necessity, the wedge means can neither move completely through and past the ring in releasing the same following its spreading, nor retract from the ring in the direction opposite that in which it moved in spreading the ring. That is to say, the tool of the invention may be used in an application wherein the ring is likely, by rebounding on its seat when released, to spring or jump from its pocket, or in the more common instances of the ring being applied immediately adjacent a work piece or machine part on the shaft or pin, which type of application does not permit the wedge means in releasing the ring to retract in a direction opposite its ring-spreading direction of movement.

A more specific object of the invention is the provision of a plier-type ring-spreading tool as aforesaid incorporating a ring-spreading element associated with one of the plier arms, which is so constructed and arranged as to provide for relative movement between said element and arm as enables the element to retract laterally from the retaining ring following its generally axial movement with respect thereto as effected spreading of the ring.

The above and other objects of a plier-type tool for use in spreading retaining rings in the assembly thereof according to the invention will appear from the following detailed description, in which reference is had to the accompanying drawings illustrating various forms of such a tool, wherein—

Fig. 2A is a perspective detail view on an enlarged and even exaggerated scale illustrating the inclination and generally axial path of movement of the spreading wedge with respect to the ring being spread;

Fig. 3 is a side elevation, partly in section, of another form of retaining-ring applying tool according to the invention;

Fig. 4 is a section taken along line 4—4 of Fig. 3;

Fig. 5 is a bottom plan view of the tool illustrated in Fig. 3;

Figs. 6 and 7 are views similar to Fig. 3, Fig. 6 illustrating the relation of the tool parts as effects maximum ring spreading, and Fig. 7 illustrating the relation of tool parts upon release of the spread ring to its shaft or pin having been effected;

Figure 1:
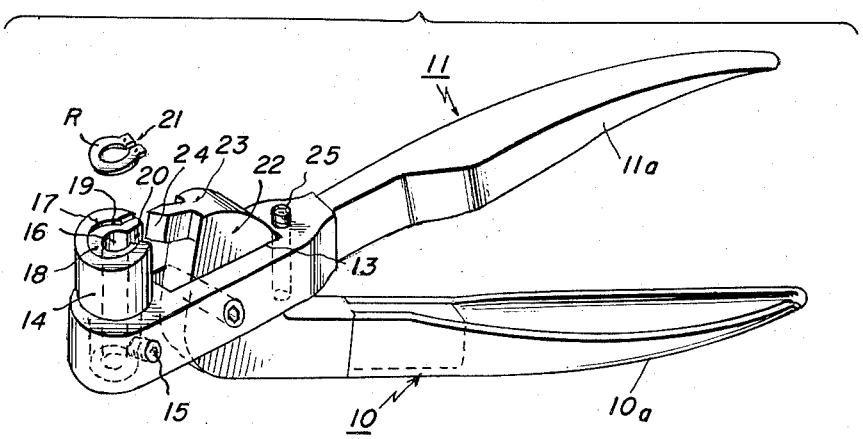
Figs. 1 and 2 are perspective views of one form of hand tool of the invention, Fig. 1 illustrating the tool before the ring-applying operation, and Fig. 2 illustrating the tool with its handles compressed to their full ring-spreading position.
Figure 2:
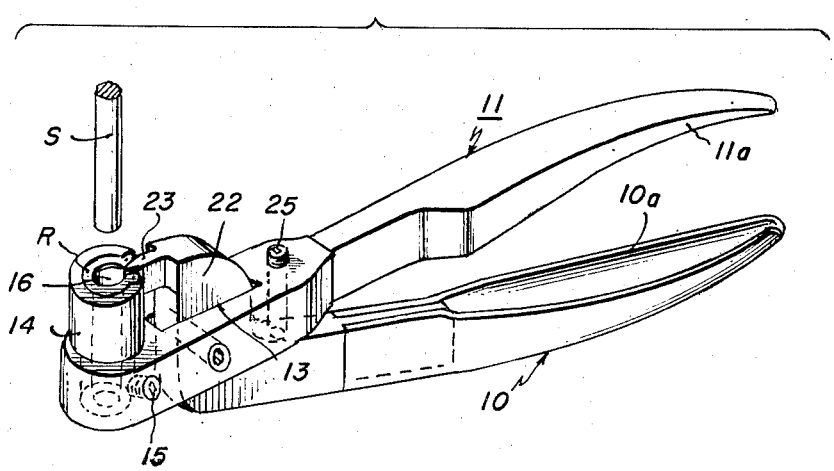

Referring to the drawings, and particularly to Figs. 1–2A, inclusive, showing perhaps the simplest form of plier-type tool for applyifng grip-type retaining rings according to the present invention, reference numerals 10 and 11 designate crossed lever arms which are pivotally connected intermediate their ends by a pivot pin 12, corresponding ends 10a, 11a of the arms to one side of the pivotal connection being shaped as conventional plier-type handles. While the arm 10 is shown to be passed bodily through a through-opening 13 provided therefor in the companion, substantially straight arm 11, it will be understood that the arms, or at least the crossing portions thereof, may instead be disposed in the more conventional side-by-side relation.

In addition to the opening 13, the arm 11 at its other or tip end is provided with another or socket opening for the reception of the reduced lower end of a preferably cylindrical ring holder 14 detachably secured in said opening as by means of a set screw 15. Said holder 14 is provided with an axial through bore 16 of diameter slightly greater than that of the shaft or pin on which ring assembly is to be effected, and the larger-diameter upper end of the holder is countersunk so as to provide an upwardly opening ring-receiving recess or pocket 17 defined by an annular bottom wall 18 and a generally circular side wall 19, and it is also slotted in axial direction so as to provide a side opening 20 communicating with both the bore 16 and the pocket 17 and facing rearwardly or toward the pivot pin 12. According to the invention, the pocket side wall 19, rather than being truly circular, is shaped substantially complementally to the outer-edge contour of a retaining ring R (in Fig. 1 shown in readiness to be spread), which is preferably of the grip-type disclosed and claimed in the aforesaid Heimann Patent No. 2,574,034, upon said ring being spread the predetermined maximum amount permitted by its design. It will be observed that such a ring has open-ended construction; that is to say, it is formed with a small-width gap 21 between its open ends, which latter are preferably formed as radially enlarged lugs or ears which may be apertured, as with conventional open-ended retaining rings of the type adapted to be seated in the groove of a shaft or similar carrier member.

According to a further feature of the invention, the companion arm 10, rather than extending straight or substantially straight as is conventional, has an intermediate crossing portion 22 which is offset approximately 90° from both handle and tip ends That is to say, if the handle end 10a of arm 10 is considered to be disposed horizontally, then the offset portion 22 extends approximately vertical, and the tip end designated 23 of said arm extends approximately horizontal and forwardly from said offset portion 22. Accordingly, as the free handle end of the arm 10 moves in a vertically ascending arc with compression of the handles, the tip end 23 of the arm moves in a vertically descending arc and hence somewhat axially with respect to a ring resting on the bottom wall 18 of the pocket 17.

Preferably, the tip end 23 of said arm has reduced width and its free end or working edge is shaped as a V-wedge in transverse section, as indicated at 24. To provide for the wedge end 24, hereinafter called the "wedge," exercising a positive holding action on a ring seated in the ring pocket 17 as holds same against the bottom wall 18 of said pocket, its apical or knife edge, rather than being disposed vertically (substantially normal to the upper and under surfaces of the tip end 23) is instead inclined downwardly-rearwardly from said upper surface, as indicated in exaggerated fashion in Fig. 2A. Thus, as the tip end 23 of plier or tool arm 10 swings downwardly responsively to compression of the handles, the wedge 24 engages on a ring seated in the pocket with a scissoring action which of course supplies substantial holding effect thereon. Preferably, the shaping of the wedge, in conjunction with the arc through which it may swing upon compression of the handle ends of the plier arms 10 and 11, is such that the wedge may enter the slot 20 just the sufficient amount as to spread a ring, such as the ring R when seated in the pocket with its gap 21 disposed in registry with said slot, the maximum predetermined amount as measured by its outer edge abutting against the pocket side wall 19.

The plier arms 10 and 11 are normally held in their open position as shown in Fig. 1 by a spring 25. To assemble a ring R on a shaft or pin S (Fig. 2), the ring R is dropped into the pocket 17 provided by the ring holder 14, properly oriented so that its gap is disposed in registry with the side opening 20. The handles 10a, 11a are now compressed, resulting in the wedge 24 lowering to the plane of the ring and entering the ring gap with a "scissoring" action, as in turn results in the ring being spread the maximum predetermined amount permitted by its design, which will of course be such that its inner edge is slightly greater than the diameter of the shaft or pin S on which it is to be assembled. Since the wedge does not extend radially inwardly beyond the inner edge of the spread ring, the shaft or pin S may now be inserted into the pocket to a desired axial position with respect to the spread ring. In a final operation, the handles are released, whereupon they open under the bias of spring 25, such resulting in the wedge 24 withdrawing from the ring gap, whereupon the ring closes around the shaft or pin S.

In the form of tool illustrated in Figs. 3–7, the above described arrangement is generally reversed in that the ring-receiving pocket opens downwardly and the wedge moves upwardly. More particularly, the companion arms 40, 41 corresponding to the aforesaid arms 10 and 11 are pivotally connected by a pin 42 journaled in spaced bearing ears which depend from the under side of said arm 41, the arms being normally maintained spread by a spring 43 reactive between the handle ends 40a, 41a of said arms. Arm 40 has an offset crossing portion 44 (corresponding to the offset portion 22 of the aforesaid plier arm 10) which extends through an opening 45 provided in the arm 41, and its tip end 46 terminates in a wedge 47 which extends in substantial continuation of said tip end and is faced so that its working edge is upwardly disposed, as is indicated in Fig. 4.

The forward or tip end of the companion arm 41 detachably mounts a cylindrical ring holder 48 which corresponds generally to the aforesaid ring holder 14 but is turned 180° with respect thereto, so that its ring-seating recess of pocket 50 opens downwardly. By reference to Figs. 3 and 5, the axially extending rearwardly opening slot 51 which provides the side opening for the ring pocket (corresponding to the aforesaid side opening 20) is disposed generally above the wedge 47 and it is cut sufficiently deep as to accommodate said wedge when the latter is moved upwardly through the plane of a ring seated in the pocket 50.

Intermediate the pivot pin 42 and spring 43 the arm 41 mounts a stop pin 53 having an enlarged head 54 whose elevation above the upper surface of said arm is determined by adjusting and lock nuts 55, 56, a spring 57 reactive between the head and the arm normally maintaining said head in its fully raised position. Preferably, the spring 57 is stiffer than the spring 43, so that a greater amount of force must be applied to the handles in compressing the spring 57 than in compressing the spring 43.

In use of a tool as aforesaid to apply a ring R to a shaft or pin S (Fig. 6), the ring placed in the pocket 50, with its gap in registry with the pocket side-opening as provided by the slot 51 and it is thereupon temporarily held to the pocket bottom by finger pressure. Handles 40a and 41a are now compressed against the force of spring 43 until the handle 40a abuts the head 54 of the pin 53. Consequent to such handle movement, the wedge 47 swings relatively upwardly toward the normally horizontal tip end of arm 41. Since the wedge 47 is disposed in substantial vertical alignment with the slot 51, and hence in similar vertical alignment with the gap of the ring seated in the pocket 50, it enters the ring gap and proceeds not only to hold the ring to its seat, but also to spread the ring with a scissoring action, as results from its engagement on the ring ends defining the gap. Here again, the shaping of the wedge 47 is such that it combines with the contouring of the side wall of the pocket 50 in spreading the ring only the predetermined maximum amount permitted by its design, which will of course be such as to permit entry of the shaft or pin S into the ring opening to the desired axial position with respect to the ring.

To effect release of the ring, the handles 40a, 41a are further compressed against the combined force of springs 43 and 57. Such results, as indicated in Fig. 7, in the wedge 47 moving upwardly into the slot 51 by an amount such that it clears the ring which it has just spread. Upon the wedge clearing the ring, the latter is released, whereupon it contracts about the shaft S.

It will be seen that the above plier construction provides for a two-stage compression of the handles, that is to say, they are pressed together with a moderate force until handle 40a abuts the head 54 of pin 53 and with a greater force to complete their closing movement. Such indicates to the operator when to insert the shaft S in the spread ring, and thereby when the ring is to be released. It is of course to be understood that the above described plier-arm and ring-holder arrangement of the Figs. 3–7 form may be reversed 180°, with the result that the wedge 47 moves in a vertically descending arc rather than in a vertically ascending arc. When the tool is so reversed, the wedge of course presses the ring against the bottom wall of the pocket 50, as well as effecting its spreading.

Figure 8:
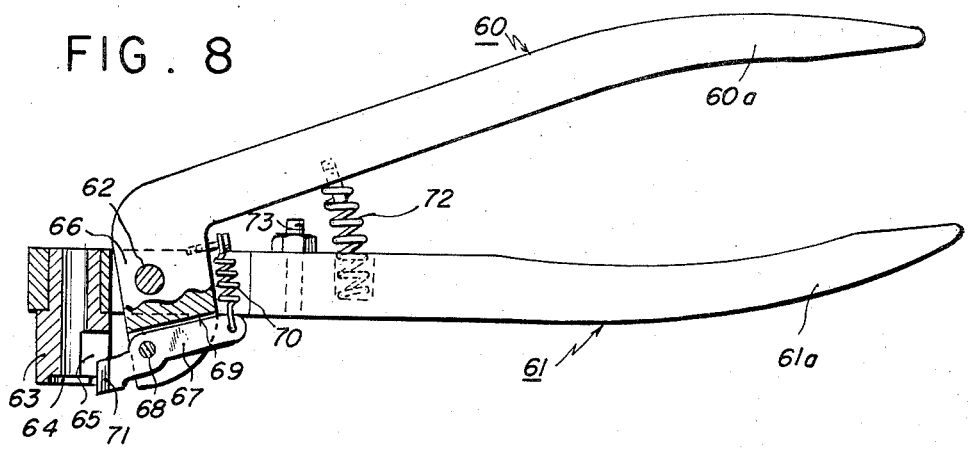
Figs. 8, 9 and 10 are views corresponding to Figs. 3, 6 and 7, respectively, but illustrating another form of ring-applying tool as herein proposed.
Figure 9:
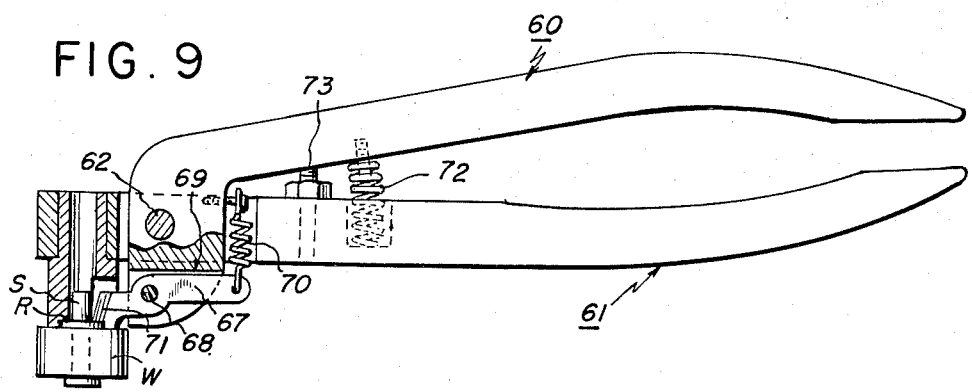
Figure 10:
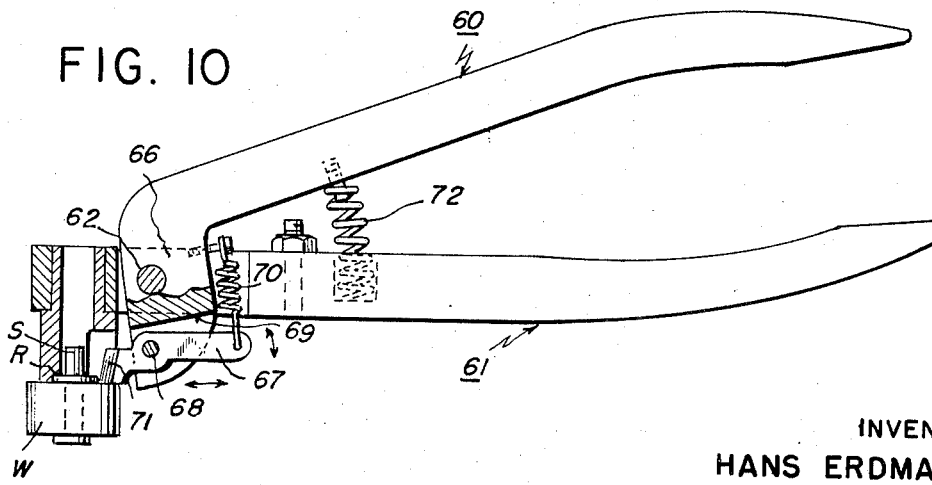

It sometimes happens that, when the wedge is forced completely through the ring gap as effects ring release according to the Figs 3–7 modification, the ring tends to rebound on its seat and thereupon to jump or spring from the pocket. To avoid this possibility, and also to provide for the common instance of the ring being applied immediately adjacent a work piece mounted on the pin or shaft, for example, to hold the work piece against a head or shoulder thereon, which workpiece then precludes retracting movement of the wedge in the direction opposite its spreading movement, the further modified form of plier-type tool as illustrated in Figs. 8–10 was developed. Here again the plier arms 60, 61, corresponding to the arms 40, 41 of the Figs. 3–7 form, are connected in crossed relation by and for pivotal movement about a pivot pin 62. The arm 61 may extend straightway and carries at its tip end a ring holder 63 corresponding to the aforesaid ring holder 48, such having a downwardly-opening ring-receiving pocket 64 and an axial slot 65 providing a side opening communicating with said pocket. However, it will be observed that the arm 60 proper is L-shaped; that its offset crossing portion 66 which extends downwardly is pivoted to the companion arm 61 near its junction with the handle end 60a; and that the length of said offset crossing portion 66 is such that its free end is disposed substantially laterally of the work holder pocket 65. Thus the free end of the arm portion 66 travels throughout the horizontal arc of a circle struck from the pivot pin 62 upon compression of the handles 60a, 61a.

According to a further feature of the invention, the tip end 67 with which said arm 60 must be provided to complete the plier structure, rather than being formed integral with said arm as in the prior modification, is instead formed separable therefrom, being pivotally connected thereto as by means of a second pivot pin 68 so as to extend generally transversely across the offset portion 66 of said arm.

As best seen in Fig. 8, the pivot pin 68 passes through the middle portion of the aforesaid separately formed tip end 67 and through the offset arm portion 66 near its side edge which is adjacent the work holder. Thus, said tip end 67 is mounted for limited clockwise swinging movement from a normally retracted position, in which its upper edge is held against the bottom straight edge 69 of a downwardly-opening bifurcation formed in the free end of the offset arm portion 66, by means of a spring 70 reactive between the offset arm portion 66 and the rear free end of said tip end member 67. At its forward end, said tip end member carries a wedge 71 which is vertically aligned with the slot 65 and thus disposed similarly to the aforesaid wedge 47, although its working edge is shown to be generally vertically disposed as in the Figs. 1 and 2 form rather than horizontally disposed. In the particular tool being described, the handles 60a and 61a are normally maintained in spread relation by means of a spring 72 functioning similarly to the spring 43 of the Figs. 3–7 modification, and an adjustable-position stop pin 73 carried by the arm 61 may also be provided to limit the amount that the handles may be compressed.

Normally, the tool parts are related as illustrated in Fig. 8, the handles being spread by the spring 72 and the separate tip end 67 of the arm 60 being maintained in its retracted position by the spring 70. When it is desired to apply a ring on a shaft, pin or the like, the ring R is inserted into the pocket 64, with its gap aligned with the pocket-side opening as provided by the slot 65, being thereupon held against the pocket bottom by finger pressure. The handles are now compressed until the handle 60a moves against the stop pin 73, such resulting in the tip end 67 moving inwardly-upwardly through the ring gap and corresponding spreading of the ring the maximum amount. With the ring now spread, the shaft or pin S having a work piece W mounted thereupon, to which a ring is to be applied immediately adjacent the upper end face of said work piece, is inserted into the holder bore and ring opening until the work-piece end face abuts the lower end edge of said holder, such by design properly positioning the spread ring immediately adjacent said end face.

As explained above, it is sometimes not desirable, in order to effect ring release, to continue movement of the wedge 71 completely through the ring gap, due to the possibility of the ring jumping or being displaced by rebound action, and in a workpiece application as above the work piece makes it impossible to retract the wedge from the ring gap by movement in direction opposite to that in which it moves into the gap. For such cases, the present tool is admirably suited, since it enables the wedge to retract laterally from the gap as effects ring release. Such will appear from a consideration of the Figs. 9 and 10 tool-part positions, of which Fig. 9 shows the tool handles compressed against the stop 73, and the work piece W precluding retraction of the wedge 71 downwardly or oppositely to the direction in which the wedge entered the ring gap. However, as seen in Fig. 10, the pivotal connection between the separate tip end 67 and offset portion 66 of the plier arm 60 enables said tip end and hence the wedge 71 to move laterally and without any downward component as the handles 60a, 61a are permitted to open under the bias of spring 72. That is to say, the wedge 71 is free to retract from the ring gap by simply riding over the work-piece end face responsively to the handles being released to in turn release the spread ring to the shaft W. Even in the absence of the work piece, the lateral movement of the free end portion of the arm offset 66 causes the wedge to move substantially laterally as permits it to retract laterally from the ring gap rather than vertically upwardly through said gap as in the Figs. 3–7 form of tool.

Without further analysis, it will be appreciated that the various forms of plier-type tool for use in assembling open-ended retaining rings including the so-called grip rings on shafts, pins and the like as described above satisfy the objectives therefor as outlined in the foregoing. However, as many changes could be made in carrying out the above constructions without departing from the scope of the invention, it is intended that all matter contained in the above description or shown in the accompanying drawing shall be interpreted as illustrative and not in a limiting sense.

I claim:

1. A plier-type tool for applying open-ended retaining rings characterized by a narrow-width gap between their open ends to shafts and the like comprising a pair of elongated arms pivotally connected in crossed relationship and providing companion handle ends and tip ends, a ring-holder mounted on the tip end of one of said arms and having an axial through bore for the reception of a shaft on which a retaining ring is to be assembled and a countersunk recess at its working end providing a ring-receiving pocket whose axis is disposed substantially in the plane of handle movement, said pocket having a substantially annular bottom wall providing a seat for the retaining ring to be assembled and a side wall which in plan is shaped complementally to the outer-edge contour of said ring when it is spread a predetermined permissible small amount enabling the shaft to be threaded therethrough, said ring holder having a slot-like side opening disposed to face the tip end of the other arm and extending through the plane of the ring pocket and with which the gap of a ring seated in said pocket is adapted to align, wedge means carried by the other tip end and being mounted responsively to compression of said handle ends for swinging movement from a normal position external of the pocket into said side opening and thereby into the gap of a seated ring so as to spread the ring the predetermined permissible amount aforesaid, the construction and arrangement being such that in moving into the ring gap said wedge means follows an arc that inclines towards the pocket bottom wall, thereby to press the seated ring against said bottom wall.

2. A plier-type tool substantially as set forth in claim 1, wherein said wedge means comprises a V-wedge terminating in an apical edge which is inclined to the axis of the ring pocket whereby said wedge means enters the ring gap with a scissoring action.

3. A plier-type tool as defined in claim 1, wherein said wedge means comprises angularly related surfaces on the free end edge of said other tip end carrying same, said surfaces meeting to provide a knife edge which is inclined to the pocket axis.

4. A plier-type tool as defined in claim 1, wherein the crossing portion of the wedge-carrying arm is offset at an angle of approximately 90° to the handle and tip ends of said arm and said offset portion extends through the companion arm.

5. A plier-type tool as defined in claim 1, wherein the crossing portion of the wedge-carrying arm is offset at an angle of approximately 90° to the handle and tip ends of said arm, and said wedge means includes a knife edge which is inclined to the plane of the pocket axis, thereby to enter the ring gap with a scissoring action.

6. A plier-type tool for applying open-ended retaining rings characterized by a narrow width gap between their open ends to shafts and the like comprising a pair of elongated arms pivotally connected in cross relationship and providing companion handle ends and tip ends, means on the tip end of one of said arms forming a ring pocket whose action is disposed substantially in the plane of handle movement and having a bottom wall providing a seat for a retaining ring to be assembled and a side wall which in plan is shaped substantially complementally to the outer edge contour of such a ring when the latter is spread a predetermined permissible amount, said bottom wall having a side opening with which the gap of a ring seated in the pocket is adapted to align, wedge means carried by the other tip end mounted responsively to compression of said handle ends for swinging movement from a normal position external of the pocket into said side opening and thence into the gap of a seated ring thereby to spread the ring the predetermined permissible amount aforesaid as determined by the ring outer edge abutting the pocket side wall, the mounting of the wedge means being such that in moving into the ring gap as aforesaid it follows an arc that inclines towards the pocket bottom wall thereby to press the seated ring against said bottom wall, said other tip end being separate from and pivotally connected to the other of said tool arms whereby it may retract laterally from the ring following spreading thereof.

7. A plier-type tool for applying open-ended retaining rings characterized by a narrow-width gap between their open ends to shafts and the like comprising a pair of arms pivotally connected in crossed relationship, one arm extending substantially straightway and mounting at its tip end a ring-holding means providing a pocket whose axis is disposed substantially in the plane of handle movement and having a bottom wall providing a seat for a retaining ring to be assembled and a side wall which in plan is shaped substantially complementally to the outer edge contour of such a ring when the latter is spread a predetermined permissible amount, said ring holding means also having an axial bore opening into the pocket for insertion of a shaft on which the ring is to be assembled, said side wall having a side opening with which the gap of a ring seated in the pocket is adapted to align, the other arm having an offset crossing portion terminating laterally of the ring pocket, a separate tip-end member for said other arm extending generally transversely across the free end of said offset crossing portion and being pivotally connected intermediate its ends to said free end adjacent the side edge thereof near the pocket, the forward end of said tip-end member being shaped as ring-spreading wedge means disposed in substantial axial registry with the pocket side opening, spring means operative between said offset crossing portion and the opposite end of said tip-end member for normally holding said member against the end edge of said offset crossing portion, the construction and arrangement being such that following movement of said arms in direction as to cause said tip-end member to move toward the tip end of said one arm as effects spreading of a ring seated in the pocket, the pivotal connection between said tip-end and offset crossing portion enables said member to retract laterally from the ring pocket responsively to movement of said arms in the opposite direction.

References Cited in the file of this patent
UNITED STATES PATENTS

| | | |
|---|---|---|
| 549,623 | Bailey | Nov. 12, 1895 |
| 1,493,477 | Crosby | May 13, 1924 |
| 1,923,199 | Hackney | Aug. 22, 1933 |
| 2,532,141 | Barkan et al. | Nov. 28, 1950 |
| 2,562,128 | Sawdy | July 24, 1951 |